(12) United States Patent
Jun

(10) Patent No.: US 12,360,434 B2
(45) Date of Patent: Jul. 15, 2025

(54) APERTURE MODULE AND CAMERA MODULE INCLUDING THE SAME

(71) Applicant: Samsung Electro-Mechanics Co., Ltd., Suwon-si (KR)

(72) Inventor: Jaewoo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 163 days.

(21) Appl. No.: 18/328,855

(22) Filed: Jun. 5, 2023

(65) Prior Publication Data

US 2024/0201565 A1    Jun. 20, 2024

(30) Foreign Application Priority Data

Dec. 15, 2022    (KR) .................. 10-2022-0176089

(51) Int. Cl.
  *G03B 9/06*    (2021.01)
  *G03B 30/00*    (2021.01)

(52) U.S. Cl.
  CPC ............... *G03B 9/06* (2013.01); *G03B 30/00* (2021.01); *G03B 2205/0076* (2013.01)

(58) Field of Classification Search
  CPC ..... G03B 9/00–70; G03B 30/00; G02B 5/005
  See application file for complete search history.

(56) References Cited

U.S. PATENT DOCUMENTS

| | | | |
|---|---|---|---|
| 4,199,247 A * | 4/1980 | Schwarz ................. | G03B 9/07 396/509 |
| 6,102,554 A * | 8/2000 | Wynne Willson ...... | F21V 11/10 362/323 |
| 7,472,998 B2 | 1/2009 | Sasazaki et al. | |
| 10,558,106 B2 * | 2/2020 | Kamo ..................... | G03B 9/06 |
| 10,859,847 B2 * | 12/2020 | Rhee ..................... | G02B 7/021 |
| 11,237,456 B2 * | 2/2022 | Kazuo ..................... | G03B 9/22 |
| 12,001,074 B2 * | 6/2024 | Hu .......................... | G02B 5/005 |

(Continued)

FOREIGN PATENT DOCUMENTS

| CN | 114911112 A | 8/2022 |
|---|---|---|
| CN | 217133471 U | 8/2022 |

(Continued)

OTHER PUBLICATIONS

Korean Office Action issued on Feb. 6, 2025, in corresponding Korean Patent Application No. 10-2022-0176089. (6pages in English, 6 pages in Korean).

*Primary Examiner* — Leon W Rhodes, Jr.
(74) *Attorney, Agent, or Firm* — NSIP Law

(57) ABSTRACT

A disclosed aperture module includes a base defining an opening; a rotation plate seated on the base and rotatable about an optical axis, and including rotation plate teeth disposed along an inner circumferential surface; an aperture driving portion coupled to the rotation plate to rotate the rotation plate in response to an input of an electrical signal; and a plurality of blades stacked in two stages and disposed inside the rotation plate, each blade including blade teeth to engage the rotation plate teeth. The blades move in conjunction with rotation of the rotation plate to define an incidence hole of variable size, and the plurality of blades are disposed to partially overlap neighboring blades of the other stage without overlapping with neighboring blades of the same stage.

15 Claims, 17 Drawing Sheets

(56) References Cited

U.S. PATENT DOCUMENTS

| | | | |
|---|---|---|---|
| 2020/0026149 A1* | 1/2020 | Jun | G03B 9/06 |
| 2020/0241387 A1 | 7/2020 | Seo et al. | |
| 2020/0264495 A1 | 8/2020 | Zhuo et al. | |
| 2021/0109305 A1* | 4/2021 | Hu | G02B 7/00 |
| 2022/0382128 A1* | 12/2022 | Lee | G03B 9/02 |
| 2023/0273504 A1 | 8/2023 | Chen et al. | |
| 2024/0219809 A1* | 7/2024 | Li | G03B 9/06 |

FOREIGN PATENT DOCUMENTS

| | | |
|---|---|---|
| JP | 4633646 B2 | 2/2011 |
| JP | 2020-27229 A | 2/2020 |
| KR | 10-2020-0101293 A | 8/2020 |
| KR | 10-2185053 B1 | 12/2020 |
| KR | 10-2304255 B1 | 9/2021 |

\* cited by examiner

APERTURE MODULE AND CAMERA MODULE INCLUDING THE SAME

CROSS-REFERENCE TO RELATED APPLICATION

This application claims priority to and the benefit under 35 USC 119(a) of Korean Patent Application No. 10-2022-0176089 filed in the Korean Intellectual Property Office on Dec. 15, 2022, the entire contents of which are incorporated herein by reference for all purposes.

BACKGROUND

Field

The following description relates to an aperture module and a camera module including the same.

Description of the Background

Cameras are basically applied to portable electronic devices such as smartphones, tablet PCs, and laptop computers. As competition for product differentiation of portable electronic devices intensifies, cases of applying general digital camera functions to portable electronic device cameras are increasing. Among them, demand for obtaining a Bokeh effect or obtaining a bright and clear picture by adjusting the amount of light using a variable aperture is also increasing.

A general digital camera has a mechanical aperture, and the mechanical aperture is driven to change the amount of incident light according to the shooting environment. However, in the case of a camera module applied to a small device such as a portable electronic device, it is difficult to apply the mechanical aperture as it is due to structural characteristics and spatial limitations.

That is, a mechanical aperture applied to the general digital camera has a large number of parts, and a plurality of rotation-type blades have a circular aperture structure and have a drawback that the thickness is large. Therefore, there is a demand for development of an aperture module that is advantageous for down-sizing and thinning that can be applied to portable electronic devices.

The above information disclosed in this Background section is only for enhancement of understanding of the background of the described technology, and therefore it may contain information that does not form the prior art that is already known in this country to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an aperture module includes a base defining an opening; a rotation plate seated on the base and configured to be rotatable about an optical axis, and including rotation plate teeth disposed along an inner circumferential surface; an aperture driving portion coupled to the rotation plate and configured to rotate the rotation plate in response to an input of an electrical signal; and a plurality of blades stacked in two stages and disposed inside the rotation plate, each blade including blade teeth configured to engage the rotation plate teeth, the blades being configured to move in conjunction with rotation of the rotation plate to define an incidence hole of variable size. The plurality of blades are disposed to partially overlap neighboring blades of the other stage without overlapping with neighboring blades of the same stage.

The aperture driving portion may include a rotor coupled to the rotation plate, and a shape memory alloy (SMA) wire having a first end connected to the rotor to rotate the rotor in response to the input of the electrical signal.

The base may include a stepped portion extending along an edge, and the SMA wire may be supported on the stepped portion and extend along the edge of the base.

The rotor may include a rotation driving portion coupled to a rotation shaft pillar protruding from one corner region of the base and a driving protrusion protruding from a driving arm portion extending from the rotation driving portion. The rotation plate may have a driving protrusion fastening groove configured to engage the driving protrusion on an outer circumferential surface.

The first end of the SMA wire may be fixed to a side of the rotation driving portion of the rotor by a first clamp.

A second end of the SMA wire may be clamped to the base by a second clamp at a diagonally opposite corner region of the one corner region of the base in which the rotation shaft pillar is disposed.

The SMA wire may include a first SMA wire and a second SMA wire extending in opposite directions along the edge of the base to either side of the rotation driving portion.

The plurality of blades may be stacked to form a plane flush with the rotation plate.

Each of the blades may include a driving section having the blade teeth at an outer end thereof, and a shielding section in which both edges from the driving section toward the center of the opening of the base extend in a straight line, and each shielding section may include a fixed shaft hole that engages a fixed shaft protrusion projecting from the base.

The shielding section of each of the blades may have a horizontally symmetrical structure, narrowing in width from the driving section toward a center of the opening of the base.

The shielding section of each of the blades may include an inner end connecting the edges, and in a state in which the opening of the base is maximally blocked, the inner end of each blade may be configured to contact an inner end of the neighboring blade of the same stage.

The shielding section of each of the blades may partially overlap with the shielding section of the neighboring blade of the other stage, and an area overlapping with the shielding section of the neighboring blade of the other stage may be enlarged as the size of the incident hole increases.

The plurality of blades may be configured to form an incidence hole with up to a ten-sided edge.

in another general aspect, a camera module includes: a housing defining an inner space; a lens driving module accommodated in the inner space of the housing; and an aperture module disposed in front of the lens driving module to adjust a size of an incidence hole. The aperture module includes a base defining an opening; a rotation plate seated on the base and configured to be rotatable about an optical axis, and including rotation plate teeth disposed along an inner circumferential surface; an aperture driving portion coupled to the rotation plate and configured to rotate the rotation plate in response to an input of an electrical signal; and a plurality of blades stacked in two stages and disposed inside the rotation plate, each blade including blade teeth configured to engage the rotation plate teeth, the blades being configured to move in conjunction with rotation of the rotation plate to define an incidence hole of variable size. The plurality of blades are disposed to partially overlap neighboring blades of the other stage without overlapping with neighboring blades of the same stage.

The aperture driving portion may include a rotor coupled to the rotation plate, and a shape memory alloy (SMA) wire having one end connected to the rotor to rotate the rotor in response to an input of an electrical signal.

The plurality of blades may be stacked to form a plane flush with the rotation plate.

The plurality of blades may be disposed such that at least five of the blades do not overlap each other in each stage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
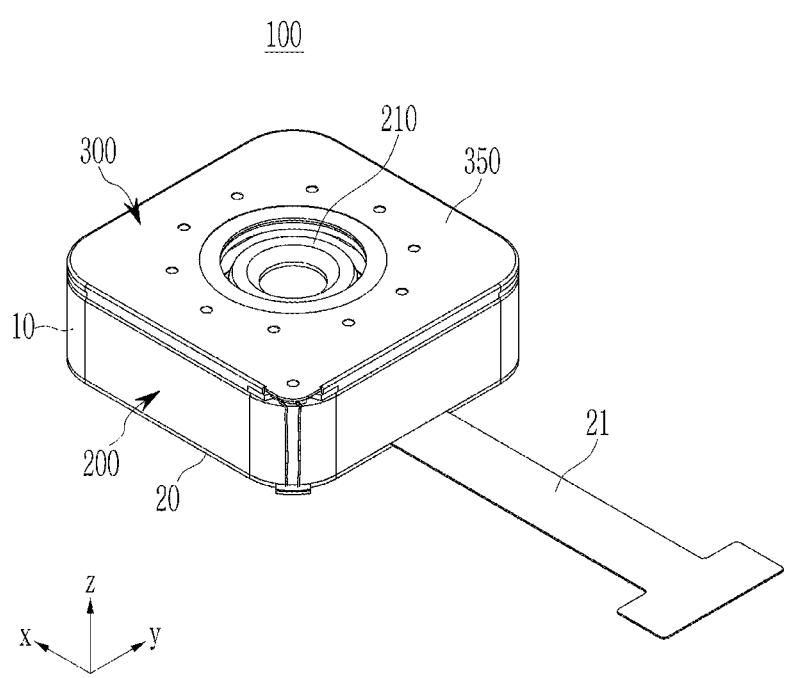
FIG. 1 is a perspective view of an appearance of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Further, throughout the specification, the phrase "on a plane" means viewing a target portion from the top, and the phrase "on a cross-section" means viewing a cross-section formed by vertically cutting a target portion from the side.

Figure 2:
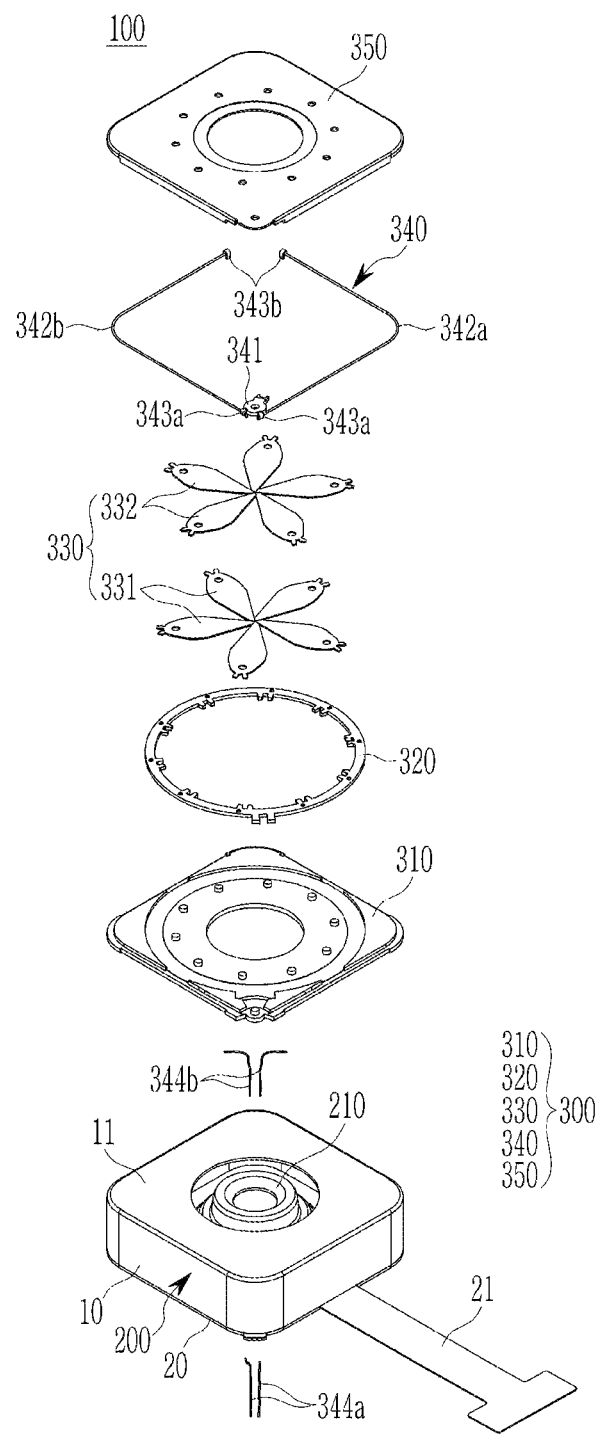
FIG. 2 is an exploded perspective view of the aperture module of FIG. 1 in a disassembled state.

FIG. 1 is a perspective view of an appearance of a camera module according to an example, and FIG. 2 is an exploded perspective view of the aperture module of FIG. 1 in a disassembled state.

Referring to FIG. 1 and FIG. 2, a camera module 100 may include a housing 10 having an inner space, a lens driving module 210 accommodated in the inner space of the housing 10, and an aperture module 300 disposed in front of the lens driving module 210. The aperture module 300 functions to adjust the size of an incident hole for light transmission.

The inner space of the housing 10 in which the lens driving module 210 is accommodated may be covered with a cover 11. A circuit board 20 may be disposed at a bottom of the housing 10, and a flexible circuit board 21 connected to the circuit board 20 may extend to the outside of the housing 10.

An image sensor unit generating an electrical image signal in response to incident light information may be disposed on the circuit board 20, and the electrical image signal generated by the image sensor unit may be transmitted to an external circuit by the flexible circuit board 21. The lens driving module 210 may comprise an imaging module 200 together with the image sensor unit.

The lens driving module 210 may include a lens module including a lens and a lens driver for moving the lens module in an optical axis direction (z-axis direction in the drawing) or a direction perpendicular to the optical axis (x-axis or y-axis direction in the drawing).

The lens module may include a lens barrel having a plurality of lenses that collect or diverge light coming from a subject to form an optical image, and a holder accommodating the lens barrel. The lens module may be accommodated inside a carrier.

The lens driver may include an auto focus (AF) driver to move the lens module along with the carrier in the direction of the optical axis, and an optical image stabilization (OIS) driver to move the lens module in a direction that is perpendicular to the optical axis within the carrier. The AF driver can adjust the focus, and the OIS driver can compensate for hand shake or screen shake during shooting.

For example, the AF driver may include an AF driving magnet and an AF driving coil, and the OIS driver may include an OIS driving magnet and an OIS driving coil. However, the lens driver is not limited thereto, and may be implemented with various driving means capable of moving the lens module in the optical axis direction (z-axis direction in the drawing) or in a direction perpendicular to the optical axis (x-axis or y-axis direction in the drawing), and this also falls within the scope of present disclosure.

The aperture module 300 may be disposed in front of the lens driving module 210 relative to the light incident direction. The aperture module 300 may include a base 310 as a support, a rotation plate 320 and a plurality of blades 330 disposed on the base 310, an aperture driving portion 340 coupled to the base 310 and the rotation plate 320, and an aperture cover 350 that covers components coupled to the base 310.

The rotation plate 320 may be a ring-shaped disk, and a plurality of blades 330 may be stacked inside the rotation plate 320 to form a plane flush with the rotation plate 320.

The aperture driving portion 340 may provide a driving force to the plurality of blades 330 via the rotation plate 320.

The aperture driving portion 340 includes a rotor 341 coupled to the rotation plate 320, shape memory alloy (SMA) wires 342a and 342b connected to the rotor 341, clamps 343a and 343b connected to the SMA wires 342a and 342b, and wires 344a and 344b connected to the clamps 343a and 343b and the circuit board 20.

The aperture module 300 may include five blades 331 positioned in the first stage and five blades 332 positioned in the second stage. That is, the aperture module 300 may include ten blades 331 and 332 in two stages. The plurality of blades 330 may be disposed so as to not overlap with blades disposed adjacent to each other at the same stage, and may be disposed to partially overlap blades disposed adjacent to each other at another stage.

FIG. 3A to FIG. 3F are perspective views of an assembling process of the aperture module shown in FIG. 2.

Figure 3A:
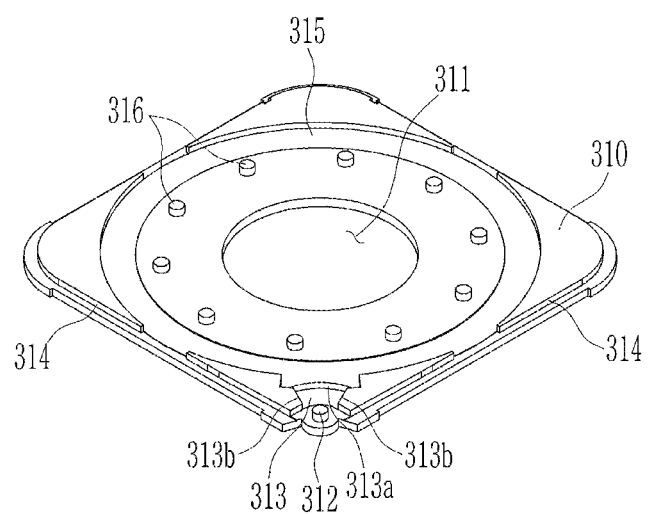
FIG. 3A, 3B, 3C, 3D, 3E, and FIG. 3F are perspective views of an assembling process of the aperture module shown in FIG. 2.

Referring to FIG. 3A, the base 310 may have a planar shape of an approximate quadrangle or square, and a circular opening 311 may be disposed at a center of the base 310. The base 310 may include a rotation axis pillar 312 and a rotation restriction area 313 around the rotation axis pillar 312.

The rotation axis pillar 312 may protrude upward from one corner region of the base 310. The rotation restriction area 313 may be delimited by a circular arc-shaped restriction wall 313a positioned between the opening 311 and the rotation axis pillar 312, and a pair of side walls 313b and 313b positioned on both sides of the restriction wall 313a. The rotation restriction area 313 may limit the rotation area of the rotor 341.

The base 310 may include stepped portions 314 disposed along the edges. The stepped portions 314 may be disposed a predetermined distance away from the outermost edge of the base 310 toward the center, and may be in a shape that is raised upward. The stepped portions 314 may be connected to surround the edges of the base 310 in a region other than the rotation restriction area 313.

The base 310 may include a seating groove 315 on which the rotation plate 320 is seated, and a plurality of fixed shaft protrusions 316 disposed inside the seating groove 315. The seating groove 315 has a shape that matches the shape of the rotation plate 320, and may be made into, for example, a ring shape. The plurality of fixed shaft protrusions 316 may be disposed along the inner circumference of the seating groove 315 on the inner side of the seating groove 315, and may be disposed equiangularly about the optical axis. The number of fixed shaft protrusions 316 may be the same as the number of blades 330.

Figure 3B:
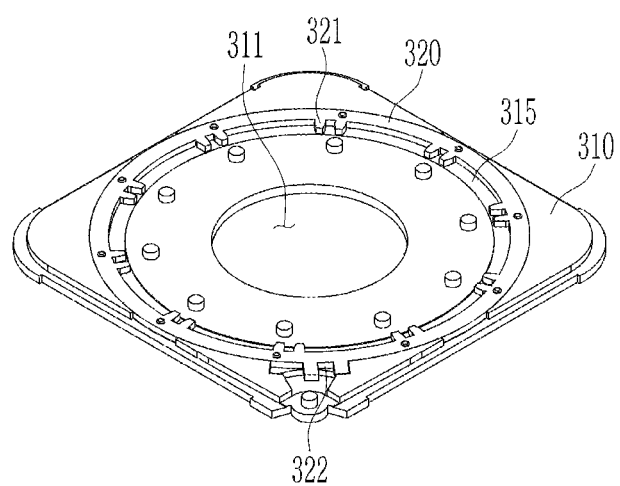

Referring to FIG. 3B, the rotation plate 320 may be disposed in the seating groove 315 of the base 310, and may rotate about the optical axis. The rotation plate 320 may have a plurality of rotation plate teeth 321 on the inner circumferential surface, and may have a driving protrusion fastening groove 322 on the outer circumferential surface.

The plurality of rotation plate teeth 321 may be disposed at regular intervals along the inner circumference of the rotation plate 320, and each of the plurality of rotation plate teeth 321 may comprise two gear teeth protruding toward the opening 311 of the base 310. The number of rotation plate teeth 321 may be the same as the number of blades 330. The driving protrusion fastening groove 322 may be disposed between two protrusions projecting outwardly from the outer circumferential surface of the rotation plate 320.

Figure 3C:
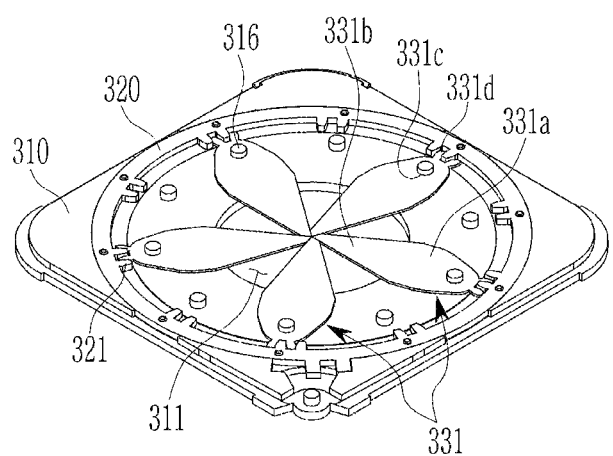
Figure 3D:
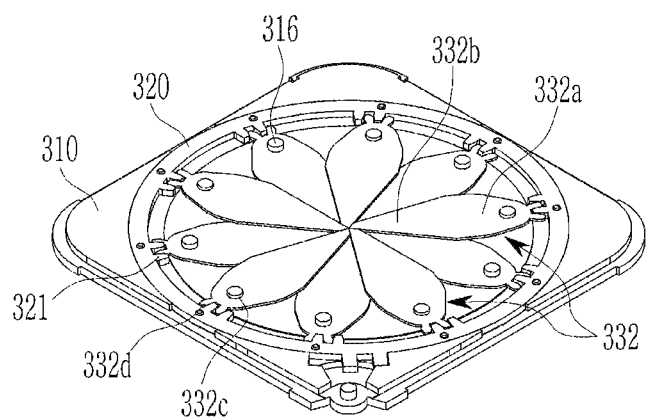

Referring to FIG. 3C and FIG. 3D, the plurality of blades 330 may be sequentially stacked in two stages on the inner circumferential surface of the rotation plate 320. The plurality of blades 330 may be stacked to form a plane flush with the rotation plate 320. That is, the plurality of blades 330 stacked on the inner circumferential surface of the rotation plate 320 may be disposed to have the same height as the rotation plate 320.

In each stage, the five blades 331 and 332 may be disposed so as to achieve point symmetry with each other relative to the center of the opening 311 of the base 310. In addition, each of the plurality of blades 331 and 332 may be disposed so as to partially overlap two blades disposed at an adjacent upper or lower stage.

Each of the plurality of blades 331 and 332 may include driving sections 331a and 332a that move to rotate about the fixed shaft protrusion 316 of the base 310, and shielding sections 331b and 332b extending from the driving sections 331a and 332a. Fixed shaft holes 331c and 332c that engage the fixed shaft protrusion 316 of the base 310 may be disposed in the driving sections 331a and 332a, and blade teeth 331d and 332d may be provided at outer ends of the driving sections 331a and 332a. The blade teeth 331d and 332d may comprise two gear teeth, and may be engaged with the rotation plate teeth 321 of the rotation plate 320.

The driving sections 331a and 332a may have a shape that increases in width from an outer end toward the center of the opening 311 of the base 310, and may have a horizontally symmetrical structure. The shielding sections 331b and 332b may have a shape that decreases in width from the driving sections 331a and 332a toward the center of the opening 311 of the base 310, and may have a horizontally symmetrical structure. Both edges of the shielding sections 331b and 332b may extend in a straight line.

In the first stage, the five blades 331 may be coupled to the base 310 and the rotation plate 320, and then in the second stage, the five blades 332 may be coupled to the base 310 and the rotation plate 320. The engagement of the blades 331 and 332 with the base 310 may be achieved by engaging the fixed shaft holes 331c and 332c of the blades 331 and 332 with the fixed shaft protrusion 316 of the base 310, and the engagement of the blades 331 and 332 with the rotation plate 320 may be achieved by engaging the blade teeth 331d and 332d with the rotation plate teeth 321 of the rotation plate 320.

Before the blades 332 of the second stage are engaged, there remain the fixed shaft protrusion 316 and the rotation plate teeth 321 to be engaged with the blades 332 of the second stage between two adjacent blades among the five blades 331 positioned in the first stage. In the second stage, the five blades 332 may be engaged with the remaining rotation plate teeth 321 and the remaining fixed shaft protrusions 316.

A plurality of blades 331 and 332 positioned at the same stage may be disposed adjacently without overlapping each other. The shielding sections 331b and 332b of each of the blades 331 and 332 may include an inner end connecting both edges, and in a state where the opening 311 of the base 310 is maximally blocked, the inner end of the shielding sections 331b and 332b may contact the inner end of the blade disposed adjacent in the same stage. The shielding section 332b of the second-stage blade 332 may be stacked to partially overlap the shielding section 331b of the first-stage blade 331.

Figure 3E:
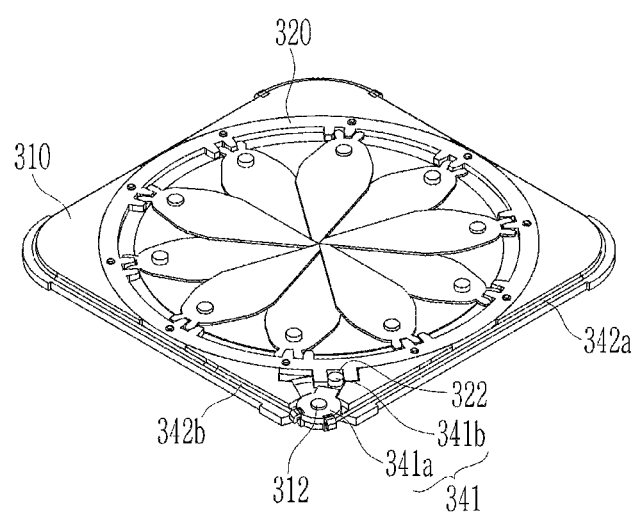

Referring to FIG. 3E, the rotor 341 may be combined with the rotation plate 320 to provide a rotation driving force to the rotation plate 320. The rotor 341 may include a rotation driving portion 341a having a through-hole into which the rotation shaft pillar 312 of the base 310 is inserted, and a driving protrusion 341b protruding upward from a driving arm portion extending from the rotation driving portion 341a. The driving protrusion 341b may be engaged with the driving protrusion fastening groove 322 of the rotation plate 320.

SMA wires 342a and 342b may be connected to the rotor 341 to rotate the rotor 341 in response to an electrical signal input. One end of each of the SMA wires 342a and 342b may be fixed to the rotation driving portion 341a of the rotor 341, and the other end thereof may be fixed to the base 310. The SMA wires 342a and 342b may be supported on the stepped portion 314 of the base 310 and may extend along the edges of the base 310.

The SMA wires 342a and 342b may include a first SMA wire 342a and a second SMA wire 342b. The first SMA wire 342a and the second SMA wire 342b may extend in opposite directions along the edges of the base 310 to have a symmetrical structure.

Figure 3F:
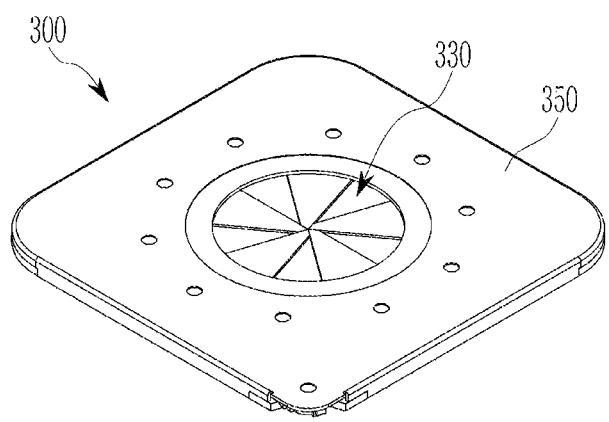

Referring to FIG. 3F, the aperture cover 350 may be coupled to the top end of the base 310 to cover the rotation plate 320, the rotor 341, the plurality of blades 330, the first SMA wire 342a, and the second SMA wire 342b all coupled to the base 310. The assembled aperture module 300 may be seated and fixed on the top end of the cover of the imaging module.

Figure 4:
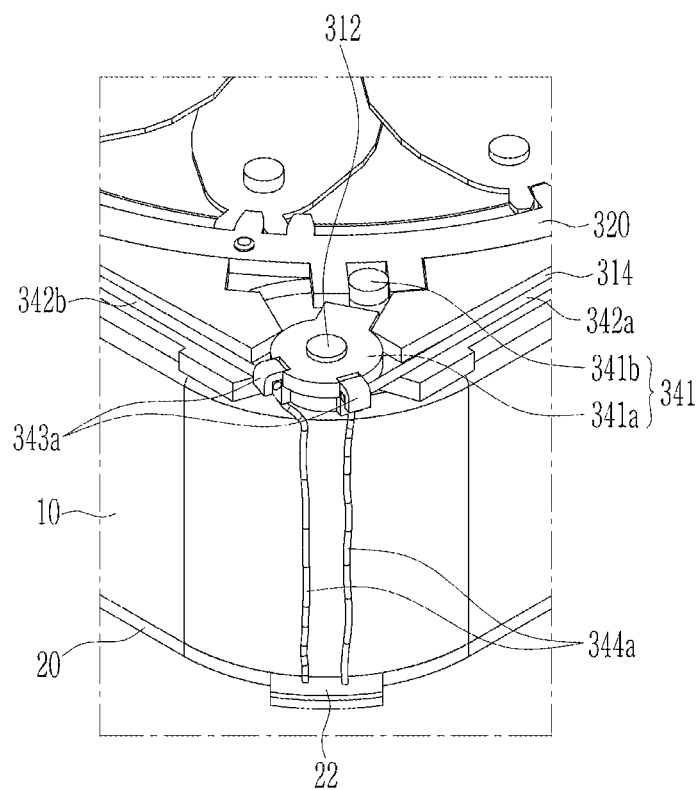
FIG. 4 is a partial perspective view that shows a corner portion where the rotor is disposed in the aperture module of FIG. 1.
Figure 5:
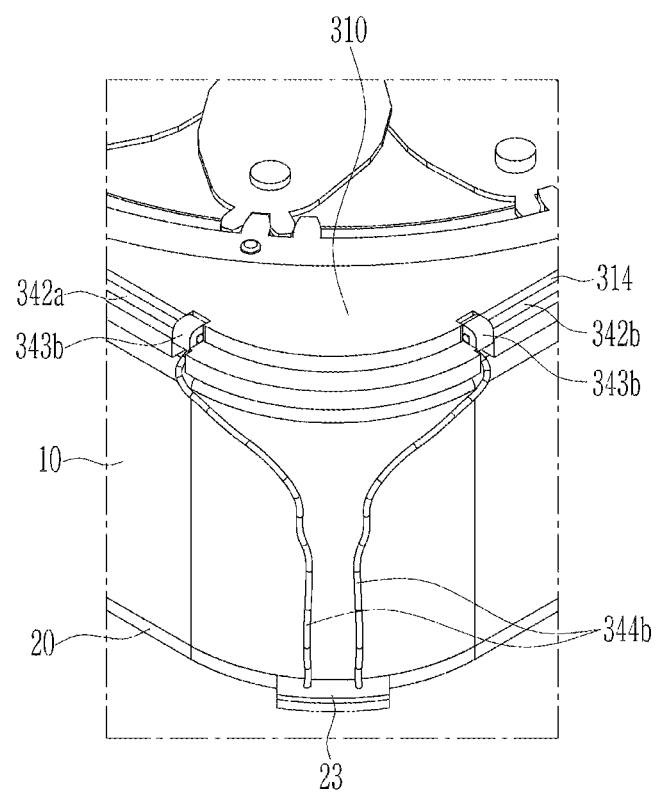
FIG. 5 is a partial perspective view of a corner portion where the SMA wire is fixed to the base in the aperture module of FIG. 1.

FIG. 4 is a partial perspective view that shows a corner portion where the rotor is disposed in the aperture module of FIG. 1, and FIG. 5 is a partial perspective view of a corner portion where the SMA wire is fixed to the base in the aperture module of FIG. 1.

Referring to FIG. 4, one end of each of the SMA wires 342a and 342b may be fixed to the side of the rotation driving portion 341a of the rotor 341 by the first clamp 343a. That is, the first SMA wire 342a and the second SMA wire 342b may be fixed to the rotation driving portion 341a of the rotor 341 and extend along the stepped portion 314 of the base 310 in different directions.

The first clamp 343a may comprise a conductive terminal and may be electrically connected to the circuit board 20 by the first wire 344a. The circuit board 20 may include a first extension 22 projecting outwardly from a side of the housing 10, and the first wire 344a extending outwardly from the housing 10 may be connected to the first extension 22. The first clamp 343a may function as a drive power input terminal for the SMA wires 342a and 342b.

Referring to FIG. 4 and FIG. 5, the base 310 may include a corner region provided with the rotation shaft pillar 312 and a corner region diagonally opposite the corner region. The other end of each of the SMA wires 342a and 342b may be fixed to the base 310 in the opposite corner region. That is, the first SMA wire 342a and the second SMA wire 342b may be fixed to the stepped portion 314 of the base 310 by the second clamp 343b at a distance from each other.

The second clamp 343b may comprise a conductive terminal and may be electrically connected to the circuit board 20 by the second wire 344b. The circuit board 20 may include a second extension portion 23 projecting outwardly from a side of the housing 10, and the second wire 344b extending outwardly from the housing 10 may be connected to the second extension portion 23. The second clamp 343b may function as a drive power input terminal for the SMA wires 342a and 342b.

FIG. 6A to FIG. 6D are top plan views sequentially showing a driving process of the aperture module shown in FIG. 1.

Figure 6A:
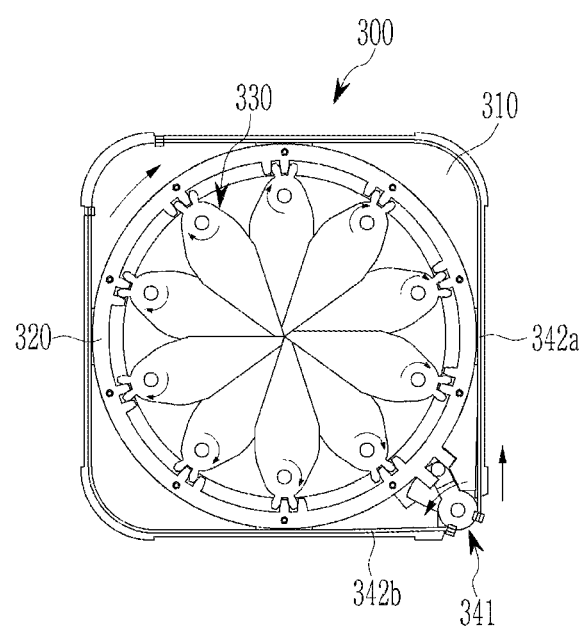
FIG. 6A, 6B, 6C, and FIG. 6D are top plan views sequentially showing a driving process of the aperture module shown in FIG. 1.

Referring to FIG. 6A, the opening of the base 310 may be completely blocked by the ten blades 330 in two stages. In this state, when power is supplied to the first SMA wire 342a, the first SMA wire 342a may contract, and the rotor 341 of the aperture module 300 may rotate in a counterclockwise direction due to the contraction of the first SMA wire 342a. Accordingly, the rotation plate 320 connected to the rotor 341 may rotate in a clockwise direction, and the blade 330 coupled to the rotation plate 320 may be driven.

Figure 6B:
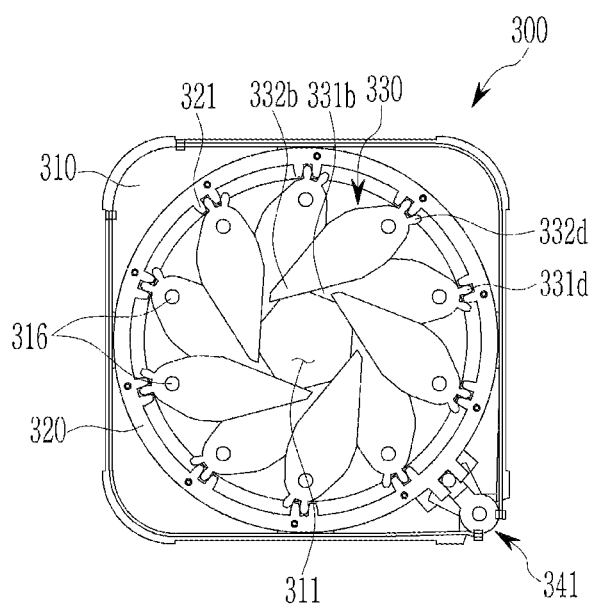
Figure 6C:
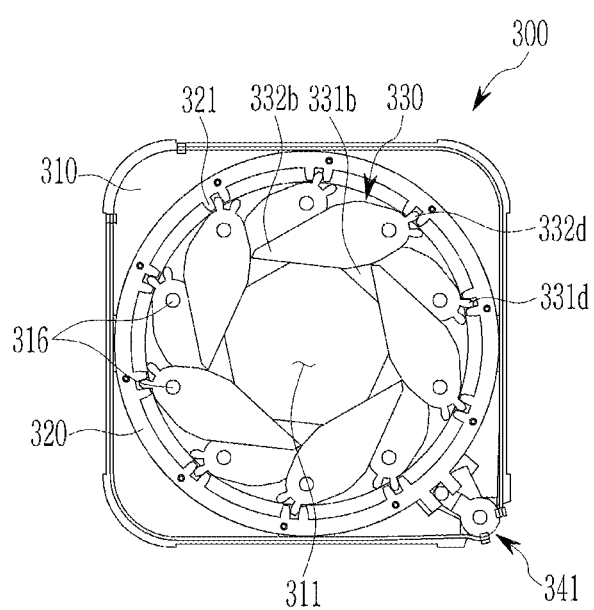

Referring to FIG. 6B and FIG. 6C, as the rotation plate teeth 321 of the rotation plate 320 move in engagement with the blade teeth 331d and 332d of each of the plurality of blades 330, the plurality of blades 330 rotate in a clockwise direction about the fixed shaft protrusion 316 of the base 310, causing the shielding sections 331b and 332b to gradually open the opening 311 of the base 310. The edges of an incidence hole of the aperture module 300 may maximally form a decagon by the combination of edges of one side of each of the shielding sections 331b and 332b.

Figure 6D:
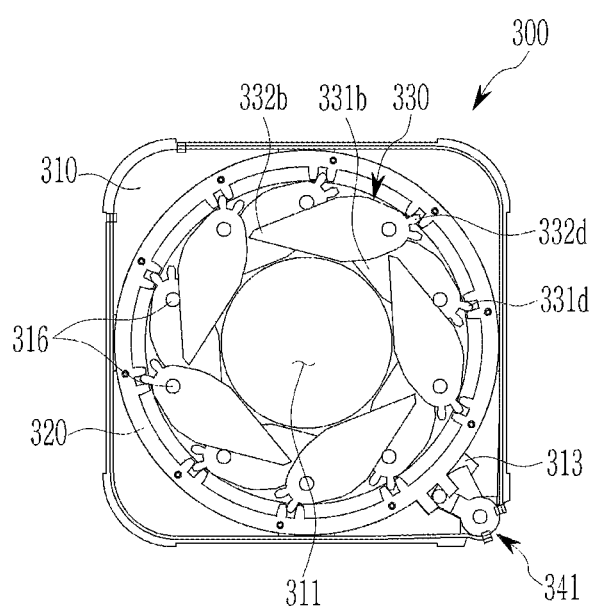

Referring to FIG. 6D, when the rotor 341 completely rotates within the rotation restriction area 313, the plurality of blades 330 completely open the opening 311 of the base 310. In this state, when power is supplied to the second SMA wire 342b, the second SMA wire 342b contracts, and as the rotor 341 of the aperture module 300 rotates in the clockwise direction due to the contraction of the second SMA wire 342b, the plurality of blades 330 may be driven in the opposite direction of the process described above.

The aperture module 300 may easily implement incidence holes with various diameters by edges of one side of each of the shielding sections 331b and 332b of the blades 330, and may continuously change the size of the incidence holes.

Figure 7A:
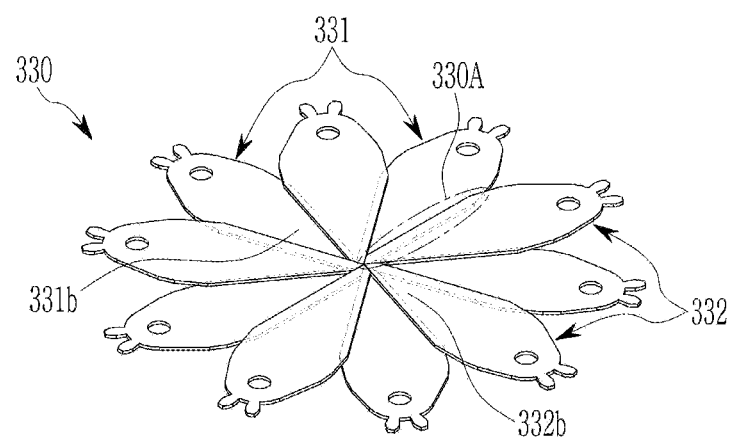
FIG. 7A, 7B, and FIG. 7C are perspective views of a stacked structure of the blade applied to the aperture module shown in FIG. 1.
Figure 7B:
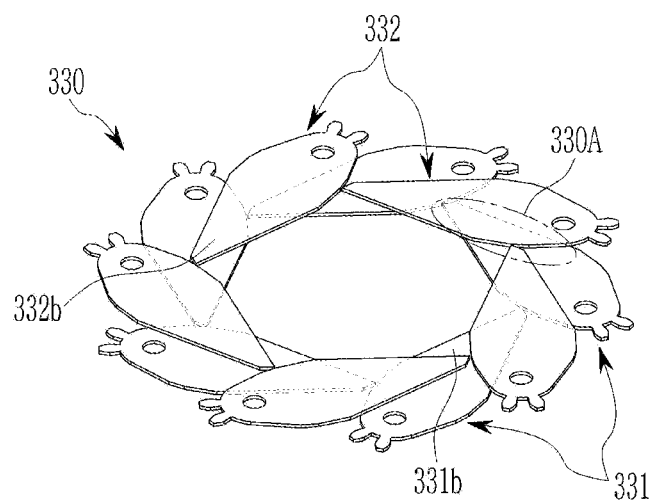
Figure 7C:
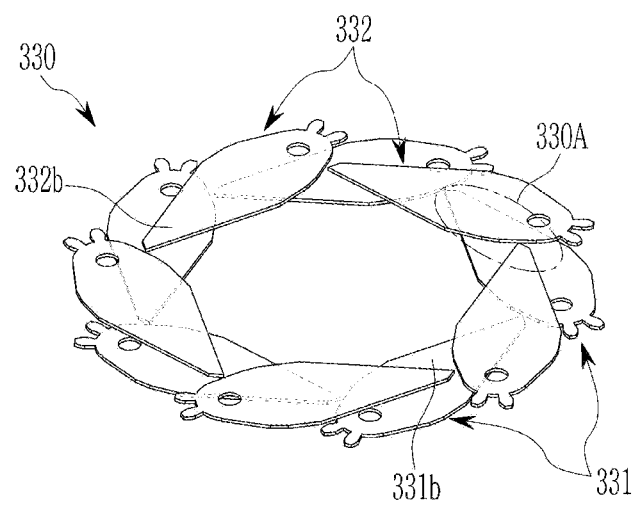

FIG. 7A to FIG. 7C are perspective views of a stacked structure of the blades applied to the aperture module shown in FIG. 1.

Referring to FIG. 7A, a plurality of blades 330 may be disposed so as to not overlap each other with adjacent blades of the same stage, and may be disposed to partially overlap adjacent blades of another stage. That is, both edges of the shielding section 332b of the second-stage blade 332 may partially overlap one side edge of the shielding section 331b of the adjacent first-stage blade 331.

The plurality of blades 330 all have ten overlapping portions 330A, and the area of the overlapping portions 330A may gradually expand as the blades 330 rotate. In a state in which the plurality of blades 330 completely block the opening 311 of the base 310, the overlapping portion 330A has a minimum area, and each overlapping portion 330A may form a straight line.

Referring to FIG. 7B and FIG. 7C, the plurality of blades 330 rotate about the fixed shaft protrusion 316 to implement an incidence hole having a ten-sided edge, and the size of the incidence hole may be gradually enlarged. The plurality of blades 330 may not overlap with adjacent blades of the same stage during rotation, and may have a wider overlapping area 330A with adjacent blades of different stages. When the opening 311 of the base 310 is maximally opened, the plurality of blades 330 may have the widest overlapping region 330A with adjacent blades at another stage.

As the plurality of blades 330 partially overlap with neighboring blades of different stages without overlapping with blades of the same stage, allowing for smooth motion without collision with neighboring blades when rotating to reduce or enlarge the incidence hole.

The aperture module 300 having the aforementioned configuration has a thinness of the two-stage blades 331 and 332, and may realize an incidence hole with a near circular, ten-sided edge. In addition, since the opening 311 of the base 310 may be completely shielded or completely opened, increasing the margin between the minimum value and the maximum value of the incidence hole of the aperture, and it is advantageous in shooting environments where a high level of light blocking is required. In addition, the aperture module 300 can have a lower operating load due to its horizontal opening and closing structure, which can result in lower power consumption, and can simplify the overall configuration by reducing the number of components.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An aperture module comprising:
   a base defining an opening;
   a rotation plate seated on the base and configured to be rotatable about an optical axis, and including rotation plate teeth disposed along an inner circumferential surface;
   an aperture driving portion coupled to the rotation plate and configured to rotate the rotation plate in response to an input of an electrical signal; and
   a plurality of blades stacked in two stages and disposed inside the rotation plate, each blade including blade teeth configured to engage the rotation plate teeth, the blades being configured to move in conjunction with rotation of the rotation plate to define an incidence hole of variable size,
   wherein the plurality of blades is stacked inside the rotation plate such that the stacked blades have a same height along an optical axis direction as a height of the rotation plate along the optical axis direction, and
   wherein the plurality of blades are disposed to partially overlap neighboring blades of the other stage without overlapping with neighboring blades of the same stage.

2. The aperture module of claim 1, wherein
   the aperture driving portion includes a rotor coupled to the rotation plate, and a shape memory alloy (SMA) wire having a first end connected to the rotor to rotate the rotor in response to the input of the electrical signal.

3. The aperture module of claim 2, wherein
   the base includes a stepped portion extending along an edge, and
   the SMA wire is supported on the stepped portion and extends along the edge of the base.

4. The aperture module of claim 2, wherein
   the rotor includes a rotation driving portion coupled to a rotation shaft pillar protruding from one corner region of the base and a driving protrusion protruding from a driving arm portion extending from the rotation driving portion, and
   the rotation plate has a driving protrusion fastening groove configured to engage the driving protrusion on an outer circumferential surface.

5. The aperture module of claim 4, wherein
the first end of the SMA wire is fixed to a side of the rotation driving portion of the rotor by a first clamp.

6. The aperture module of claim 4, wherein
a second end of the SMA wire is clamped to the base by a second clamp at a diagonally opposite corner region of the one corner region of the base in which the rotation shaft pillar is disposed.

7. The aperture module of claim 4, wherein
the SMA wire includes a first SMA wire and a second SMA wire extending in opposite directions along the edge of the base to either side of the rotation driving portion.

8. The aperture module of claim 1, wherein
each of the blades includes a driving section having the blade teeth at an outer end thereof, and a shielding section in which both edges from the driving section toward the center of the opening of the base extend in a straight line, and
each driving section includes a fixed shaft hole that engages a fixed shaft protrusion projecting from the base.

9. The aperture module of claim 8, wherein
the shielding section of each of the blades has a horizontally symmetrical structure, narrowing in width from the driving section toward a center of the opening of the base.

10. The aperture module of claim 8, wherein
the shielding section of each of the blades includes an inner end connecting the edges, and
in a state in which the opening of the base is maximally blocked, the inner end of each blade is configured to contact an inner end of the neighboring blade of the same stage.

11. The aperture module of claim 8, wherein
the shielding section of each of the blades partially overlaps with the shielding section of the neighboring blade of the other stage, and an area overlapping with the shielding section of the neighboring blade of the other stage is enlarged as the size of the incident hole increases.

12. The aperture module of claim 1, wherein
the plurality of blades are configured to form the incidence hole having up to a ten-sided edge.

13. A camera module comprising:
a housing defining an inner space;
a lens driving module accommodated in the inner space of the housing; and
an aperture module disposed in front of the lens driving module to adjust a size of an incidence hole,
wherein the aperture module comprises:
a base defining an opening;
a rotation plate seated on the base and configured to be rotatable about an optical axis, and including rotation plate teeth disposed along an inner circumferential surface;
an aperture driving portion coupled to the rotation plate and configured to rotate the rotation plate in response to an input of an electrical signal; and
a plurality of blades stacked in two stages and disposed inside the rotation plate, each blade including blade teeth configured to engage the rotation plate teeth, the blades being configured to move in conjunction with rotation of the rotation plate to define an incidence hole of variable size,
wherein the plurality of blades is stacked inside the rotation plate such that the stacked blades have a same height along an optical axis direction as a height of the rotation plate along the optical axis direction, and
wherein the plurality of blades are disposed to partially overlap neighboring blades of the other stage without overlapping with neighboring blades of the same stage.

14. The camera module of claim 13, wherein
the aperture driving portion includes a rotor coupled to the rotation plate, and a shape memory alloy (SMA) wire having one end connected to the rotor to rotate the rotor in response to the input of the electrical signal.

15. The camera module of claim 13, wherein
the plurality of blades are disposed such that at least five of the blades do not overlap each other in each stage.

* * * * *